(12) United States Patent
Lockhart et al.

(10) Patent No.: US 9,643,696 B1
(45) Date of Patent: May 9, 2017

(54) PADDLEBOARD SEAT ASSEMBLIES

(71) Applicants: Keith C. Lockhart, Shreveport, LA (US); Timothy A. Dunigan, Shreveport, LA (US)

(72) Inventors: Keith C. Lockhart, Shreveport, LA (US); Timothy A. Dunigan, Shreveport, LA (US)

(73) Assignee: Padillak, L.L.C., Shreveport, LA (US)

( * ) Notice: Subject to any disclaimer, the term of this patent is extended or adjusted under 35 U.S.C. 154(b) by 0 days.

(21) Appl. No.: 14/837,246

(22) Filed: Aug. 27, 2015

Related U.S. Application Data

(60) Provisional application No. 62/043,008, filed on Aug. 28, 2014.

(51) Int. Cl.
*B63B 35/79* (2006.01)
*B63B 35/85* (2006.01)
*A01K 97/10* (2006.01)
*B63B 29/04* (2006.01)

(52) U.S. Cl.
CPC .............. *B63B 35/85* (2013.01); *A01K 97/10* (2013.01); *B63B 29/04* (2013.01); *B63B 35/79* (2013.01); *B63B 2029/043* (2013.01)

(58) Field of Classification Search
CPC ...................................... B63B 35/85
USPC ............................................ 114/363; 441/74
See application file for complete search history.

(56) References Cited

U.S. PATENT DOCUMENTS

| | | | | |
|---|---|---|---|---|
| 4,752,261 A | * | 6/1988 | Rosello Zoya | B63B 35/795 114/363 |
| 4,795,381 A | * | 1/1989 | Willems | B63B 35/79 440/21 |
| 4,919,384 A | * | 4/1990 | Grimberg | B23Q 9/0014 248/646 |
| 6,443,786 B2 | | 9/2002 | Woolley | |
| 8,246,407 B2 | | 8/2012 | Roland | |
| 8,590,478 B2 | * | 11/2013 | Lipman | B63B 35/71 114/347 |
| 8,752,492 B1 | | 6/2014 | Harris | |
| 2009/0277371 A1 | * | 11/2009 | Flynn | B63B 29/04 114/363 |
| 2012/0077396 A1 | * | 3/2012 | Lipman | B63B 35/79 441/74 |
| 2013/0189885 A1 | | 7/2013 | Wood et al. | |

* cited by examiner

*Primary Examiner* — Lars A Olson
*Assistant Examiner* — Jovon Hayes
(74) *Attorney, Agent, or Firm* — R. Keith Harrison

(57) ABSTRACT

A paddleboard seat assembly for a paddleboard includes an assembly base including a pair of spaced-apart assembly base rails each having a plurality of modular rail segments connected in end-to-end relationship to each other and a seat carried by the assembly base rails of the assembly base.

18 Claims, 17 Drawing Sheets

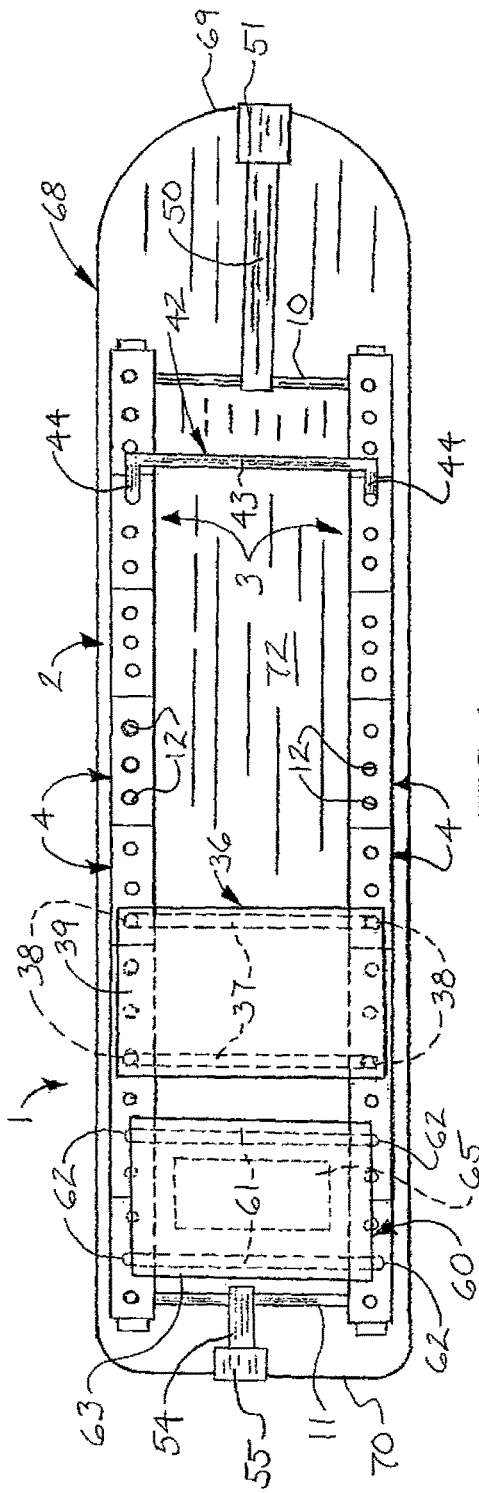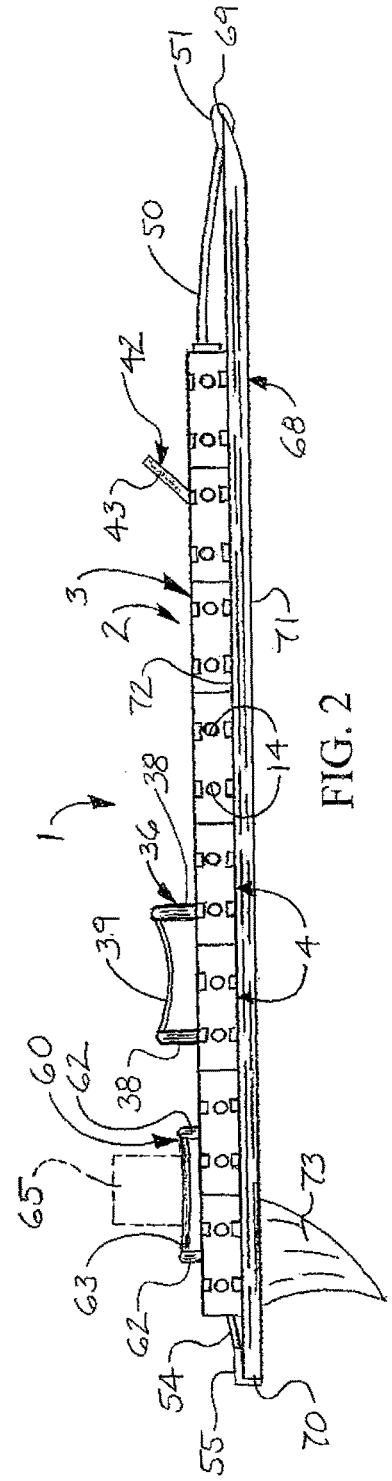
FIG. 1
FIG. 2

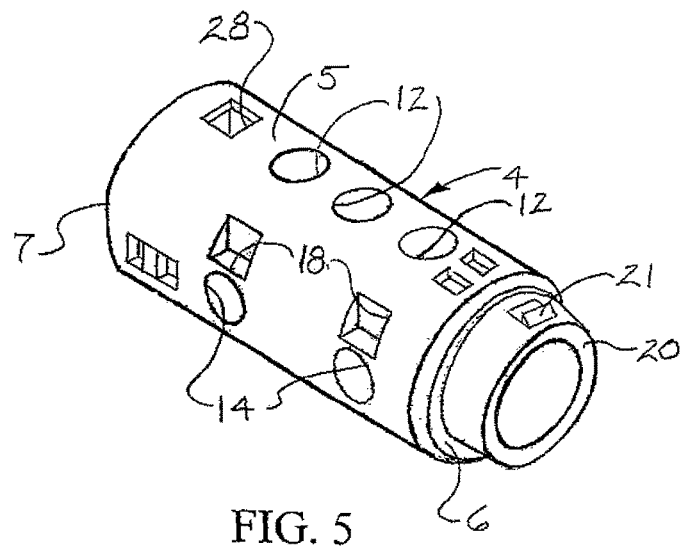
FIG. 5
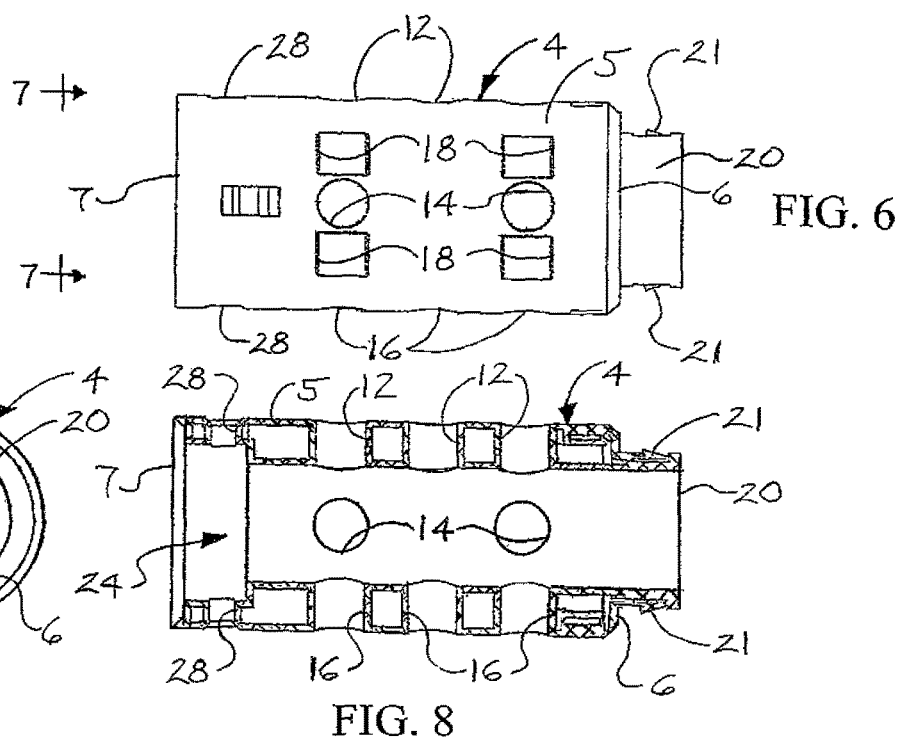
FIG. 6
FIG. 7
FIG. 8

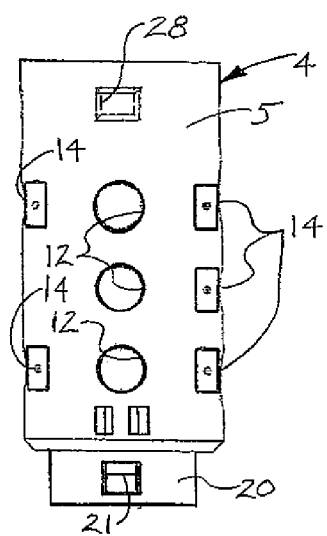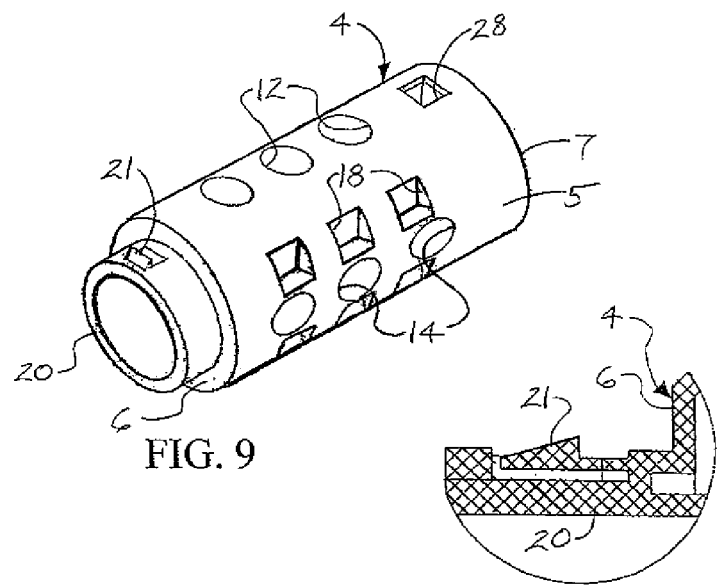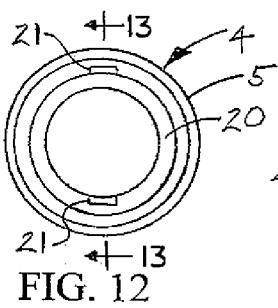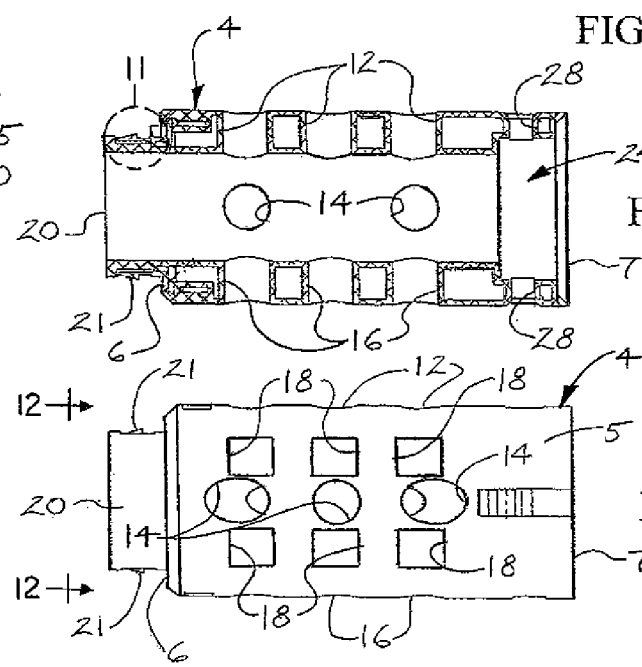

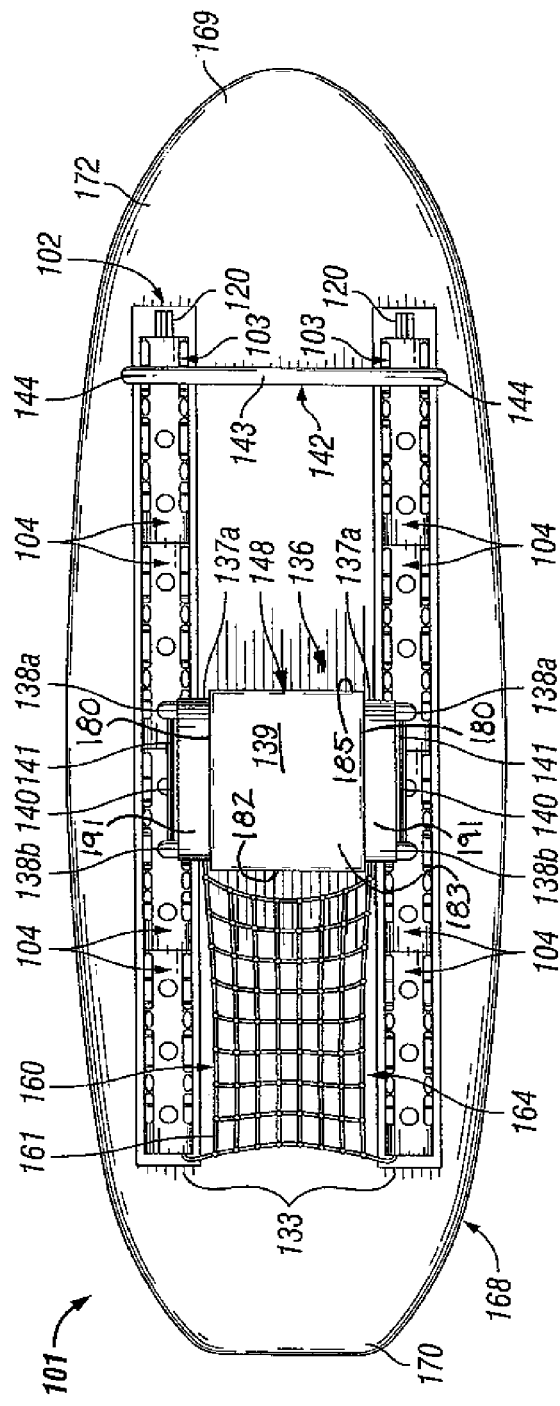

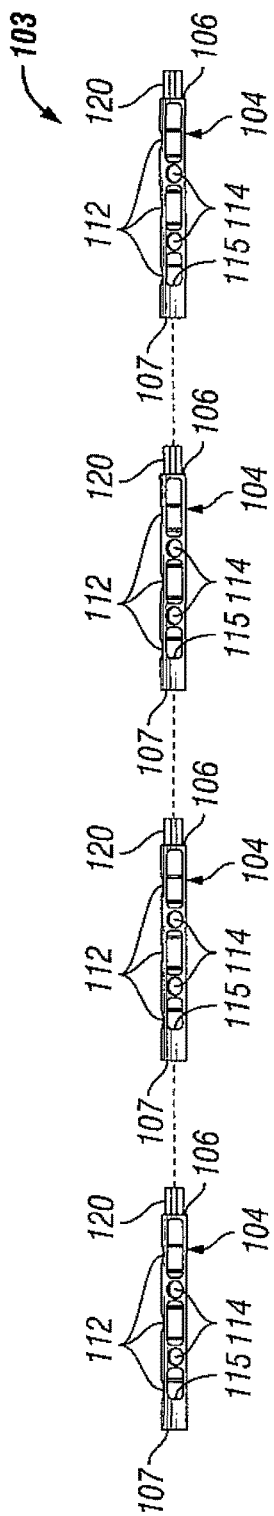
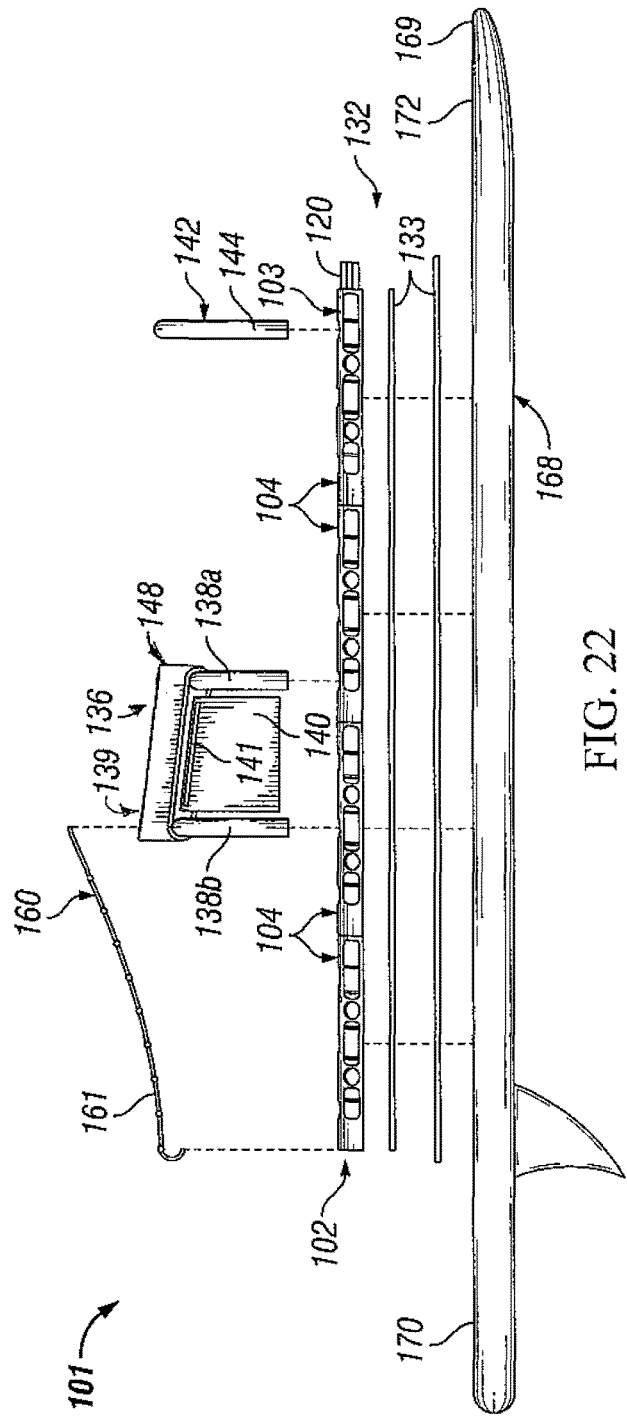
FIG. 21
FIG. 22

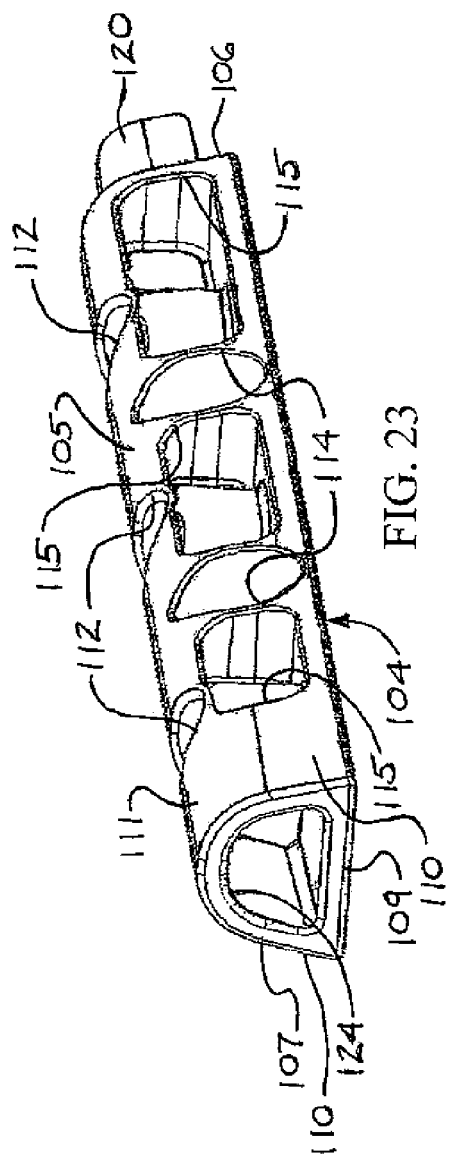
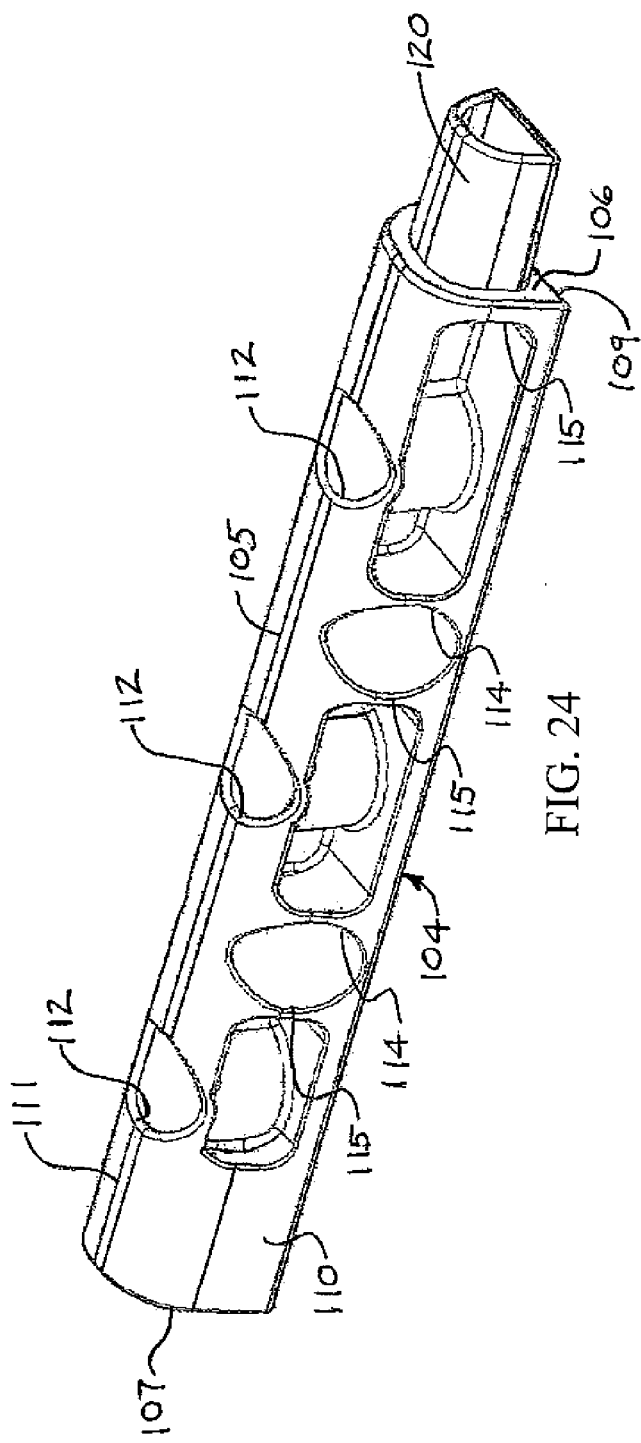
FIG. 23
FIG. 24

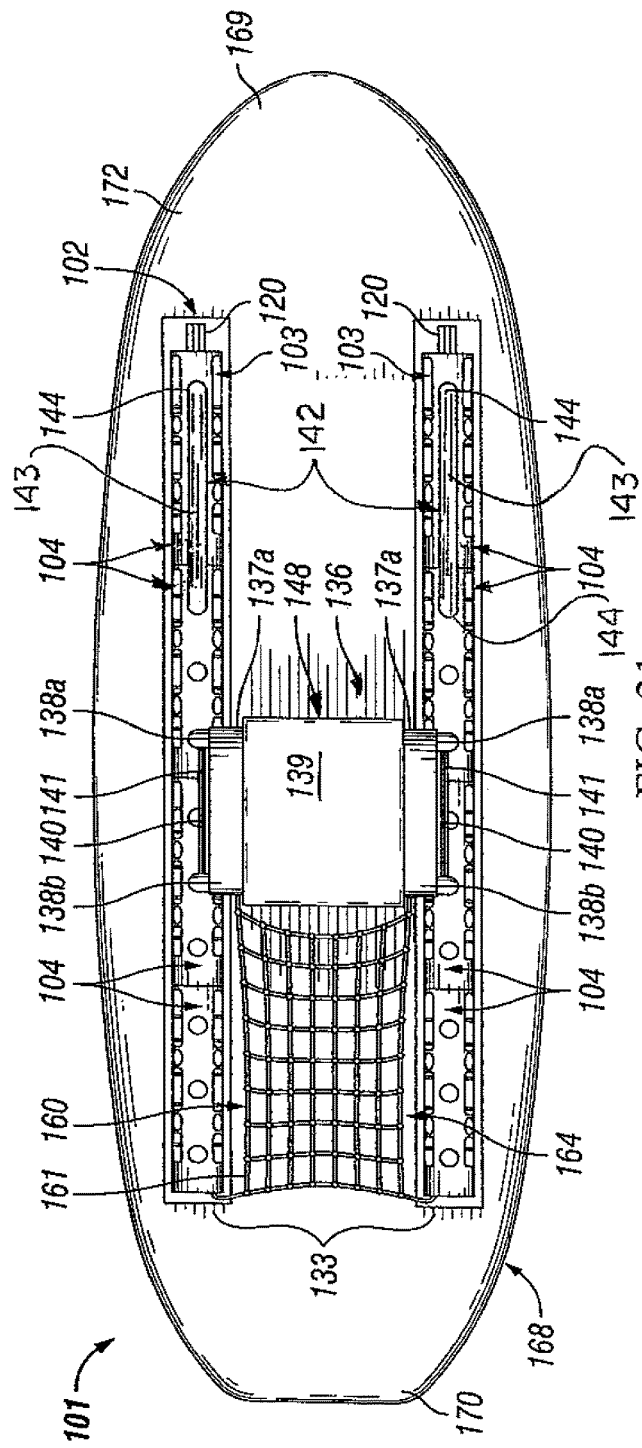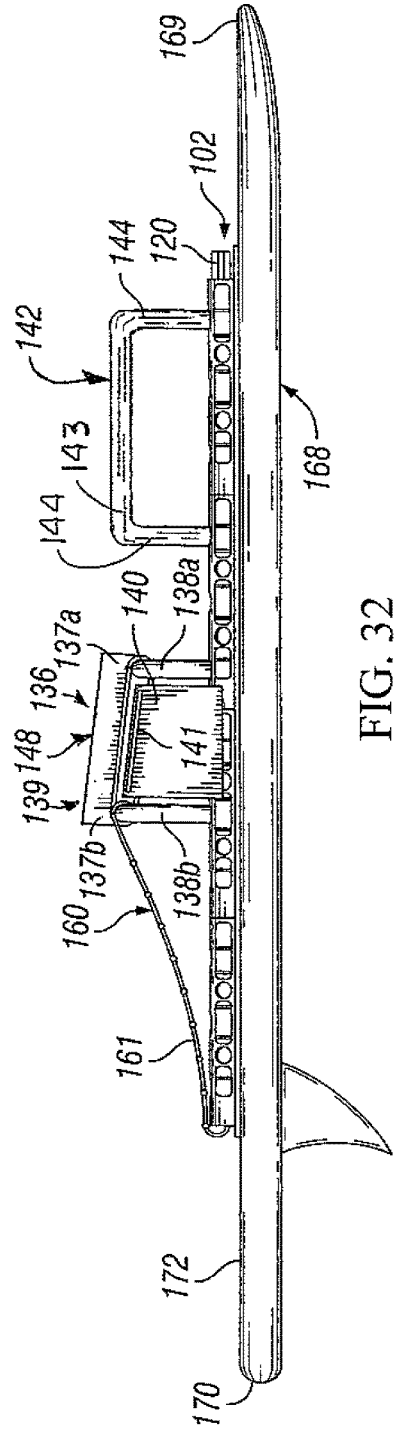
FIG. 31
FIG. 32

US 9,643,696 B1

PADDLEBOARD SEAT ASSEMBLIES

CROSS-REFERENCE TO RELATED APPLICATIONS

This application claims the benefit of U.S. provisional application No. 62/043,008, filed Aug. 28, 2014 and entitled "PADDLEBOARD SEAT ASSEMBLY", which provisional application is incorporated by reference herein in its entirety.

FIELD

Illustrative embodiments of the disclosure generally relate to paddleboards. More particularly, illustrative embodiments of the disclosure relate to paddleboard seat assemblies which enable a user of a paddleboard to comfortably sit while paddling a paddleboard on a body of water.

BACKGROUND

The background description provided herein is solely for the purpose of generally presenting the context of the illustrative embodiments of the disclosure. Aspects of the background description are neither expressly nor impliedly admitted as prior art against the claimed subject matter.

Paddle boarding is a sport which is becoming increasingly popular in the United States and around the world. Paddle boarding involves the use of an elongated paddleboard which floats on the surface of a body of water. A user typically stands on the paddleboard and works a paddle to propel the board along the surface of the water. After prolonged periods of use, however, the user may become tired of standing.

Accordingly, paddleboard seat assemblies which enable a user of a paddleboard to comfortably sit while paddling a paddleboard on a water body are desirable.

SUMMARY

Illustrative embodiments of the disclosure are generally directed to a paddleboard seat assembly which enables a user of a paddleboard to comfortably sit while paddling a paddleboard on a body of water. An illustrative embodiment of the paddleboard seat assembly includes an assembly base including a pair of spaced-apart assembly base rails each having a plurality of modular rail segments connected in end-to-end relationship to each other and a seat carried by the assembly base rails of the assembly base.

BRIEF DESCRIPTION OF THE DRAWINGS

Illustrative embodiments of the disclosure will now be described, by way of example, with reference to the accompanying drawings, in which:

FIG. 1 is a top view of an illustrative embodiment of the paddleboard seat assemblies, deployed in place on a paddleboard in typical application of the assembly;

FIG. 2 is a side view of the illustrative paddleboard seat assembly on the paddleboard;

FIG. 5 is a right side perspective view of a typical rail segment of a modular assembly base rail;

FIG. 6 is a side view of the rail segment illustrated in FIG. 5;

FIG. 7 is a rear end view, taken along viewing lines 7-7 in FIG. 6, of the rail segment;

FIG. 8 is a longitudinal sectional view, taken along section lines 8-8 in FIG. 7, of the rail segment;

FIG. 9 is a left side perspective view of a typical rail segment of the modular assembly base rail;

FIG. 10 is a top view of a typical rail segment;

FIG. 11 is an enlarged sectional view, taken along section line 11 in FIG. 13, of a typical connector tab on a male connector provided on each rail segment;

FIG. 12 is a front view, taken along section lines 12-12 in FIG. 14, of the rail segment;

FIG. 13 is a longitudinal sectional view, taken along section lines 13-13 in FIG. 12, of the rail segment;

FIG. 14 is a side view of a typical rail segment;

FIG. 17 is a top view of the alternative illustrative paddleboard seat assembly illustrated in FIG. 16, deployed on the paddleboard;

FIG. 18 is a side view of the alternative illustrative paddleboard seat assembly deployed on the paddleboard;

FIG. 21 is an exploded side view illustrating typical assembly of a modular assembly base rail of the alternative illustrative paddleboard seat assembly;

FIG. 22 is an exploded side view of the alternative illustrative paddleboard seat assembly, more particularly illustrating typical attachment of the assembly to the paddleboard;

FIG. 23 is a right side perspective view of a typical rail segment of the modular assembly base rail of the alternative illustrative paddleboard seat assembly;

FIG. 24 is a left side perspective view of the typical rail segment of the modular assembly base rail of the alternative illustrative paddleboard seat assembly;

FIG. 31 is a top view of the illustrative paddleboard seat assembly illustrated in FIG. 30;

FIG. 32 is a side view of the illustrative paddleboard seat assembly illustrated in FIG. 30;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front", "rear", "upper", "side" and "lower" are used in aid in an understanding of the illustrative embodiments of the methods and are not intended to be construed in a limiting sense.

Figure 15:
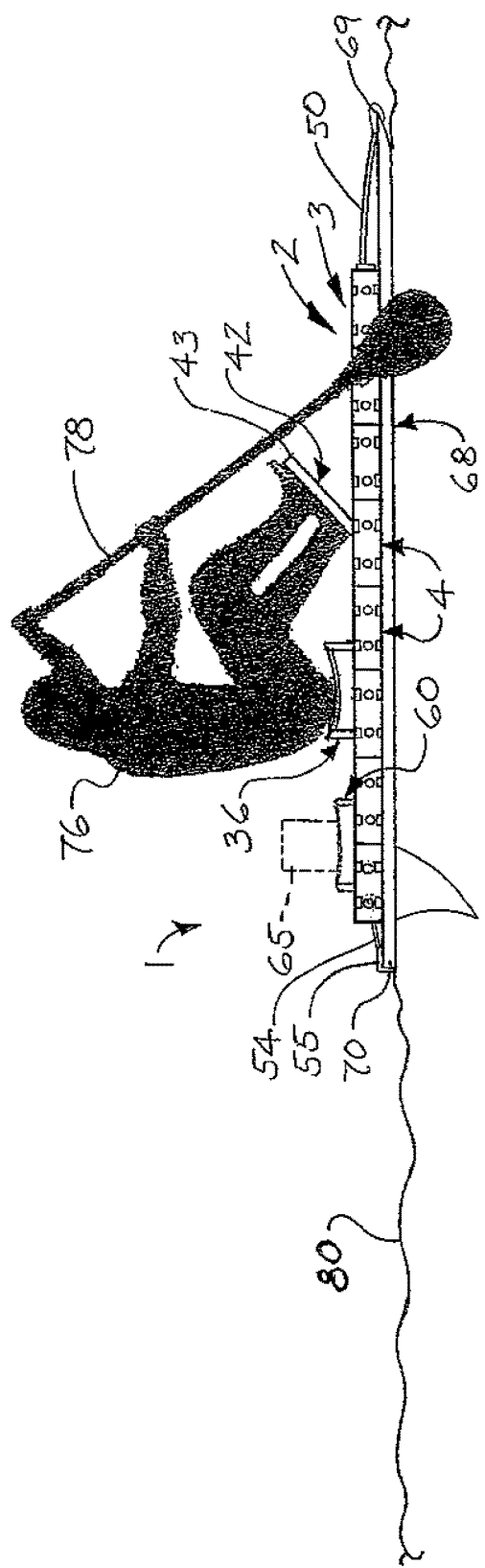
FIG. 15 is a side view of the illustrative paddleboard seat assembly deployed on a paddleboard floating on a body of water, with a paddleboard user seated on the assembly and paddling the paddleboard in typical application of the assembly.

Referring to the drawings, an illustrative embodiment of the paddleboard seat assembly is generally indicated by reference numeral 1. As illustrated in FIG. 15 and will be hereinafter described, the paddleboard seat assembly 1 enables a paddleboard user 76 to sit on a paddleboard 68 while working a paddle 78 to propel the paddleboard 68 on a body of water 80. Accordingly, the paddleboard seat assembly 1 may include a seat 36 for the paddleboard user 76. In some embodiments, the paddleboard seat assembly 1 may include a footrest 42 which may support or anchor the feet of the paddleboard user 76 as the paddleboard user 76 sits on the seat 36. In some embodiments, the paddleboard seat assembly 1 may include an accessory holder 60 which may be used support an ice chest 65 or other accessory or may alternatively be used as an extra seat for an additional paddleboard user or passenger, for example and without limitation.

Figure 3:
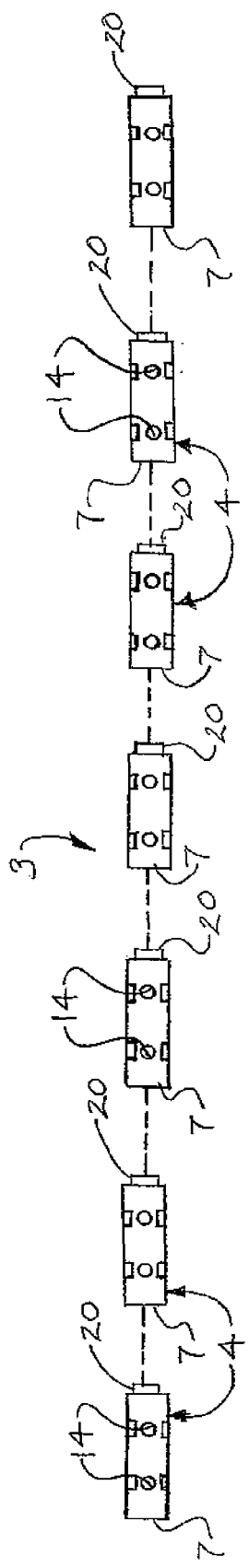
FIG. 3 is an exploded side view illustrating typical assembly of a modular assembly base rail of the paddleboard seat assembly.

As illustrated in FIG. 1, the paddleboard seat assembly 1 may include an assembly base 2 which is adapted for attachment to the paddleboard 68 typically in a manner which will be hereinafter described. The assembly base 2 may include a pair of generally elongated, parallel, spaced-apart assembly base rails 3. As illustrated in FIG. 3, each assembly base rail 3 of the assembly base 2 may have a modular construction with multiple rail segments 4 which detachably interlock with each other in end-to-end relationship. As used herein, "modular" means that the rail segments 4 may be interchangeable with each other in position within each assembly base rail 3.

As illustrated in FIGS. 5-14, each rail segment 4 of each assembly base rail 3 may include a rail segment body 5 which may be generally elongated. In some embodiments, the rail segment body 5 may be generally cylindrical with a generally circular cross-sectional shape, as illustrated. In other embodiments, the rail segment body 5 may have a generally rectangular or alternative cross-sectional shape. The rail segment body 5 may be fabricated of plastic such as PVC, metal, composite materials and/or any other material which is consistent with the functional requirements of the assembly base 2 using molding, casting, machining and other conventional fabrication techniques known by those skilled in the art.

The rail segment body 5 may have a male connector end 6 and a female connector end 7. Accordingly, in the assembled assembly base rail 3, the male connector end 6 on the rail segment body 5 of each rail segment 4 may detachably engage the companion female connector end 7 on the rail segment body 5 of an adjacent rail segment 4. A male connector 20 may protrude from the male connector end 6 on the rail segment body 5 of each rail segment 4. As illustrated in FIGS. 8 and 13, a connector cavity 24 may be provided in the female connector end 7 of the rail segment body 5. Thus, in assembly of each assembly base rail 3, the male connector 20 on the rail segment body 5 of each rail segment 4 may be inserted into the companion connector cavity 24 in the female connector end 7 on the rail segment body 5 of an adjacent rail segment 4. At least one flexible connector tab 21 may be provided on the male connector 20. At least one connector tab opening 28 may be provided in the segment body 5 adjacent to the female connector end 7. Thus, upon insertion of the male connector 20 on one rail segment 4 into the companion connector cavity 24 in the female connector end 7 of the adjacent rail segment 4, the connector tab 21 may snap into the connector tab opening 28 to detachably or releasably secure the rail segments 4 to each other in the assembled assembly base rail 3. The rail segments 4 can be selectively detached from each other by depressing each connector tab 21 in the corresponding connector tab opening 28 and then separating the rail segments 4 from each other.

At least one upper connector opening 12 may be provided in the rail segment body 5 of each rail segment 4. In some embodiments, a set of multiple upper connector openings 12 may be provided in the rail segment body 5, as illustrated. The upper connector openings 12 may be arranged in spaced-apart relationship to each other along a longitudinal axis of the rail segment body 5.

At least one side connector opening 14 may be provided in at least one side of the rail segment body 5 of each rail segment 4. In some embodiments, multiple side connector openings 14 may be provided in the rail segment body 5, as illustrated. The side connector openings 14 may be arranged in spaced-apart relationship to each other along a longitudinal axis of the rail segment body 5 and in parallel relationship to the set of multiple upper connector openings 12.

In some embodiments, at least one lower connector opening 16 may be provided in the rail segment body 5 of each rail segment 4. In some embodiments, multiple lower connector openings 16 may be provided in the rail segment body 5, as illustrated. The lower connector openings 16 may be arranged in spaced-apart relationship to each other along a longitudinal axis of the rail segment body 5 and in parallel relationship to the set of multiple upper connector openings 12 and the set of multiple side connector openings 14. In some embodiments, multiple chamfered depressions 18 may be provided in the rail segment body 5 of each rail segment 4. In some embodiments, the lower portion of the rail segment body 5 of each rail segment 4 may be generally flat to accommodate the planar upper surface 72 of the paddleboard 68.

Each of the upper connector openings 12, the side connector openings 14 and the lower connector openings 16 may have any desired shape including but not limited to a circular, oval or a rectangular or other polyhedral shape. In some embodiments, at least one of the upper connector openings 12, the side connector openings 14 and/or the lower connector openings 16 may extend into the rail segment body 5 in generally perpendicular with respect to the longitudinal axis of the rail segment 4. In some embodiments, at least one of the upper connector openings 12, the side connector openings 14 and/or the lower connector openings 16 may extend into the rail segment body 5 in generally angled or beveled relationship with respect to the longitudinal axis of the rail segment 4.

The upper connector openings 12, the side connector openings 14 and the lower connector openings 16 in each rail segment 4 may facilitate attachment of the assembly base rails 3 to each other in the assembly base 2 as well as attachment of the seat 36, the footrest 42 and the accessory holder 60 to the assembly base 2. As illustrated in FIG. 1, at least one base rail connecting member 10, 11 may attach the assembly base rails 3 to each other in the assembly base 2. In some embodiments, a front base rail connecting member 10 and a rear base rail connecting member 11 may connect the front and rear ends, respectively, of the base rails 3 to each other in the assembly base 2. Accordingly, the ends of the front base rail connecting member 10 and the rear base rail connecting member 11 may be inserted in the side connector openings 14 of a pair of rail segments 4 in the respective assembly base rails 3. The front base rail connecting member 10 and the rear base rail connecting member 11 may be secured in the side connector openings 14 via a friction fit, threaded, quick disconnect and/or other connection known by those skilled in the art.

As illustrated in FIG. 1, the seat 36 may include a pair of generally elongated, parallel, spaced-apart seat frame members 37 (illustrated in phantom). A pair of seat insertion segments 38 (FIG. 2) may extend perpendicularly from opposite ends, respectively, of each seat frame member 37. The seat insertion segments 38 of each seat frame member 37 may be inserted into the upper connector openings 12 of a pair of rail segments 4 in the respective assembly base rails 3 and may be secured therein via a friction fit, threaded, quick disconnect and/or other connection known by those skilled in the art to mount the seat frame members 37 on the assembly base rails 3 in upward-standing relationship to the assembly base 2. A seat panel 39 may be provided on the seat frame members 37. The seat panel 39 may include a solid panel of fabric material, mesh or other suitable material.

The footrest 42 may include an elongated footrest frame member 43. A pair of angled footrest insertion segments 44 may extend perpendicularly from opposite ends of the footrest frame member 43. The footrest insertion segments 44 may be inserted into the upper connector openings 12 of a pair of rail segments 4 in the respective assembly base rails 3 and may be secured therein via a friction fit, threaded, quick disconnect and/or other connection known by those skilled in the art to mount the footrest frame member 43 on the assembly base rails 3 in upward-standing relationship to the assembly base 2. It will be appreciated by those skilled in the art that the seat 36 and the footrest 42 may each be independently placed at any desired position along the length of the assembly base rails 3 according to the length of the paddleboard user's legs and the comfort of the paddleboard user 76 by selecting the desired upper connector openings 12 in the assembly base rails 3.

As illustrated in FIG. 1, the accessory holder 60 may include a pair of generally elongated, parallel, spaced-apart holder frame members 61. A pair of frame insert segments 62 (FIG. 2) may extend perpendicularly from opposite ends of each holder frame member 61. The frame insert segments 62 of each holder frame member 61 may be inserted into the upper connector openings 12 of a pair of rail segments 4 in the respective assembly base rails 3 and may be secured therein via a friction fit, threaded, quick disconnect and/or other connection known by those skilled in the art to mount the holder frame members 61 on the assembly base rails 3 in upward-standing relationship to the assembly base 2. A holder panel 63 may be provided on the holder frame members 61 of the accessory holder 60. The holder panel 63 may include a solid panel of fabric material, mesh or other suitable material.

Figure 4:
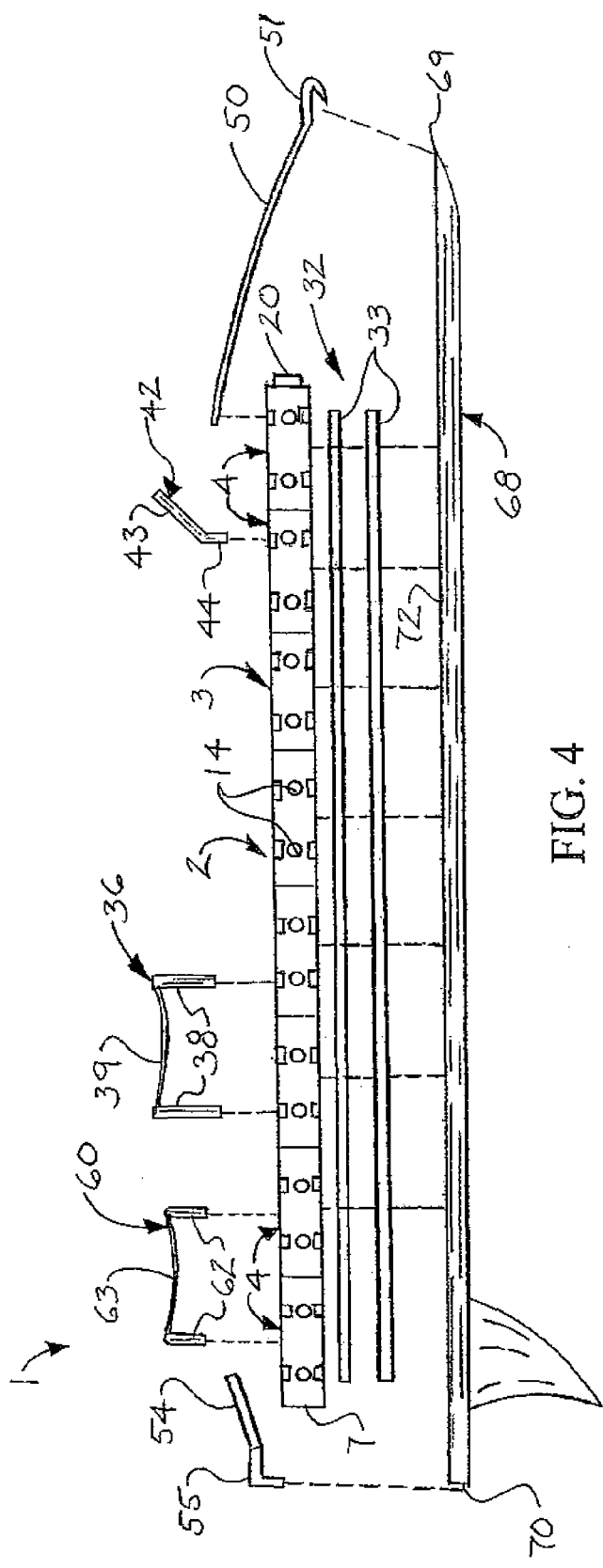
FIG. 4 is an exploded side view of an illustrative paddleboard seat assembly, more particularly illustrating typical attachment of the assembly to the paddleboard.

As illustrated in FIG. 4, the assembly base 2 may be attached to the paddleboard 68 using a base attachment device 32. The base attachment device 32 may include any type of device, mechanism, apparatus, structure, compound, element, component or any combination thereof which is suitable for the purpose of fixedly or detachably attaching the assembly base 2 to the paddleboard 68. For example and without limitation, in some embodiments, the base attachment device 32 may include at least one pair of complementary hook and loop fastener strips 33. Other non-limiting examples which are suitable for the base attachment device 32 include suction cups, hooks, snaps, adhesives, clamps, clips, brackets, mechanical fasteners or any combination thereof. In some embodiments, the assembly base 2 may be fabricated in one piece with the paddleboard 68 according to the knowledge of those skilled in the art.

As illustrated in FIGS. 1, 2 and 4, in some embodiments, a front stabilizing strap 50 may stabilize the assembly base 3 on the paddleboard 68. As illustrated in FIG. 1, the front stabilizing strap 50 may be attached to the base rail connecting member 10, as illustrated, or to some other suitable component or portion of the assembly base 2. A front strap hook 51 may terminate the front stabilizing strap 50. The front strap hook 51 may detachably engage a front end 69 of the paddleboard 68.

As further illustrated in FIGS. 1, 2 and 4, in some embodiments, the paddleboard seat assembly 1 may further include a rear stabilizing strap 54 which stabilizes the assembly base 3 on the paddleboard 68. As illustrated in FIG. 1, the rear stabilizing strap 54 may be attached to the rear base rail connecting member 11, as illustrated, or to some other suitable component or portion of the assembly base 2. A rear strap hook 55 may terminate the rear stabilizing strap 54. The rear strap hook 55 may detachably engage a rear end 70 of the paddleboard 68.

In typical application of the paddleboard seat assembly 1, the assembly base 2 may be initially assembled by connecting the rail segments 4 in end-to-end relationship in each assembly base rail 3, as was heretofore described with respect to FIG. 3. A selected number of the rail segments 4 may be connected to each other to achieve a selected length of each assembly base rail 3, typically depending on the length of the paddleboard 68. The seat 36, the footrest 42 and the accessory holder 60 may be deployed on the assembly base 2 in any desired respective positions along the length of the assembly base rails 3 typically according to the preferences and comfort of the paddleboard user 76 (FIG. 15), as was heretofore described with respect to FIG. 4. The assembled assembly base 2 may be attached to an upper surface 72 of the paddleboard 68 typically via the base attachment device 32 (FIG. 4). In some applications, an ice chest 65 which contains food, beverages and/or the like may be placed on the accessory holder 60.

As illustrated in FIG. 15, the paddleboard 68 with the paddleboard seat assembly 1 deployed thereon may be placed on a body of water 80 such as a lake or ocean. A paddleboard user 76 may sit on the seat 36 and place his or her feet on the footrest 42 as the paddleboard user 76 propels the paddleboard 68 on the surface of the body of water 80 by working the paddle 78. The paddleboard user 76 can selectively and alternatively stand on the paddleboard 68 or sit on the seat 36 and work the paddle 78. Accordingly, the seat 36 and the footrest 42 enable the paddleboard user 76 to rest between periods of standing on the paddleboard 68, particularly during prolonged periods of using the paddleboard 68. In some applications, a second paddleboard user or passenger (not illustrated) may be seated on the accessory holder 60. After use, the assembly base 2 may remain attached to the paddleboard 68, or may alternatively be detached from the paddleboard 68 for separate storage.

Referring next to FIGS. 16-36 of the drawings, an alternative illustrative embodiment of the paddleboard seat assembly is generally indicated by reference numeral 101. In the paddleboard seat assembly 101, elements which are functionally analogous to the same elements in the paddleboard seat assembly 1 heretofore described with respect to FIGS. 1-15 are designated by the corresponding reference numerals in the 101-199 series. Unless otherwise noted, the paddleboard seat assembly 101 may have the same or similar features and components which were heretofore described with respect to the paddleboard seat assembly 1.

The paddleboard seat assembly 100 includes an assembly base 102 having a pair of elongated, spaced-apart assembly base rails 103. As illustrated in FIG. 21, each assembly base rail 103 may have a modular construction with multiple rail segments 104 connected end-to-end. The rail segments 104 may have substantially the same construction and may be interchangeable with each other in position within each assembly base rail 103. As illustrated in FIGS. 23-28, each rail segment 104 of each assembly base rail 103 may include an elongated rail segment body 105 having a male connector end 106 and a female connector end 107. A male connector 120 may extend from the male connector end 106. A connector cavity 124 may extend into the female connector end 107. In some embodiments, the connector cavity 124 in each rail segment 104 may be sized and configured to accommodate the companion male connector 120 on an adjacent rail segment 104 in a friction-fit. In some embodiments, the male connector 120 may be releasably secured in the connector cavity 124 via a snap-fit or interference fit using connector tabs and companion tab openings (not illustrated), as was described above with respect to the paddleboard seat assembly 1 in FIGS. 5-15.

A generally flat or planar rail segment base 109 may extend between the male connector end 106 and the female connector end 107. A pair of rail segment base side walls 110 may extend from opposite side edges of the rail segment base 109, typically in generally angular relationship toward each other. A convex rail segment base upper wall 111 may extend between the rail segment base side walls 110. Multiple, spaced-apart upper connector openings 112, each of which may be circular, may extend into the rail segment base upper wall 111. Multiple, spaced-apart, circular side connector openings 114 may extend into each rail segment base side wall 110. Rectangular side connector openings 115 may extend into each rail segment base side wall 110 between or in alternating relationship to the circular side connector openings 114.

Figure 33:
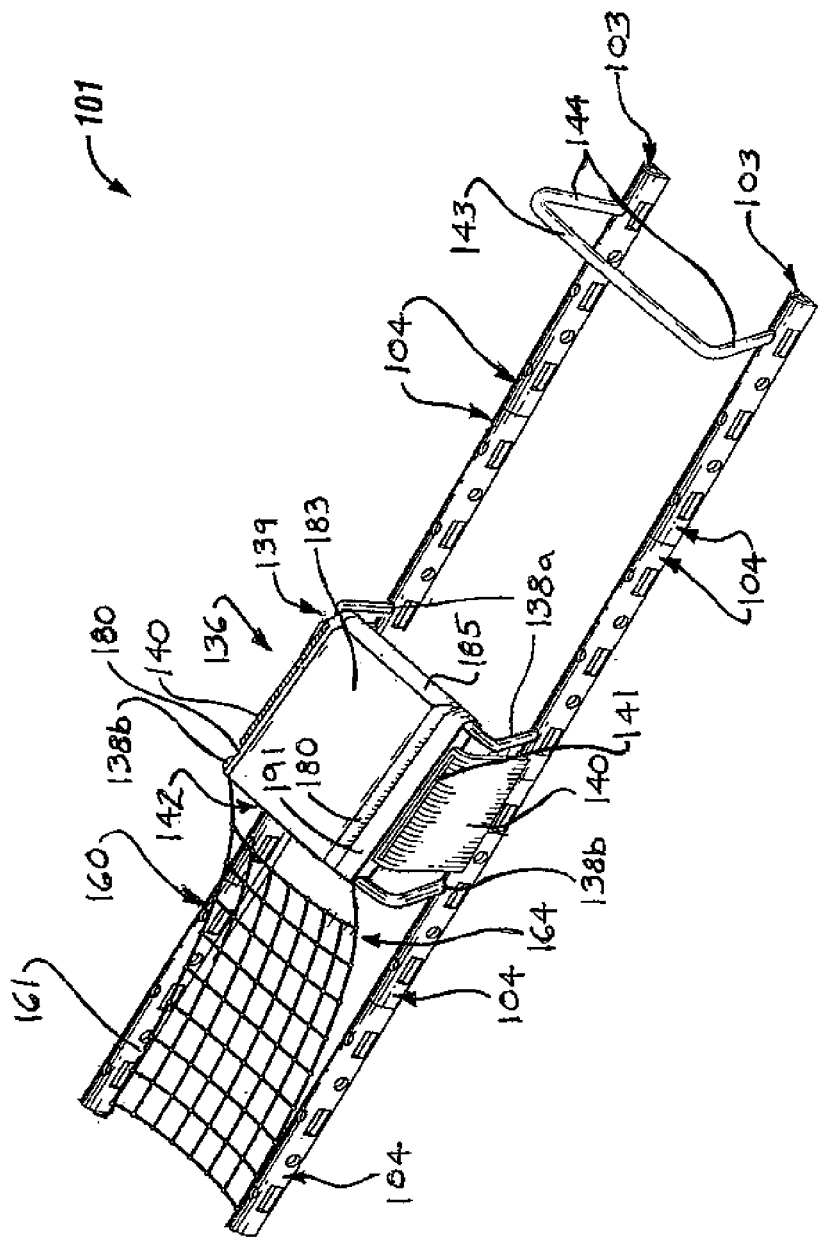
FIG. 33 is a perspective view of an illustrative embodiment of the paddleboard seat seat assembly, removed from a paddleboard (not illustrated)
Figure 34:
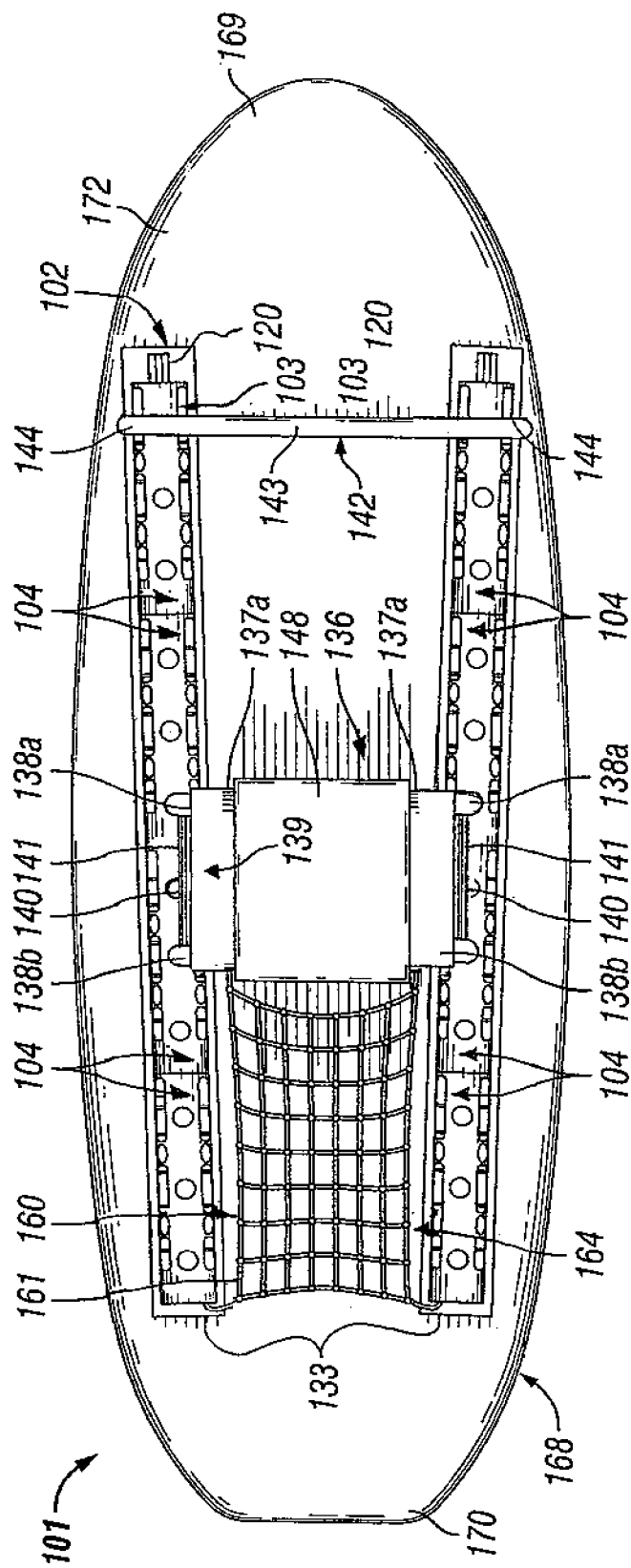
FIG. 34 is a top view of an illustrative embodiment of the paddleboard seat assembly, with the assembly base rails of the assembly base diverging from the rear end toward the front end of the paddleboard.

As illustrated in FIG. 22, a base attachment device 132 may attach each assembly base rail 103 of the assembly base 102 to the upper paddleboard surface 172 of the paddleboard 168. In some embodiments, the base attachment device 132 may include at least one pair of complementary hook and loop fastener strips 133. In other embodiments, the base attachment device 132 may include alternative fastening techniques which are known by those skilled in the art and suitable for the purpose, such as suction cups, hooks, snaps, adhesives, clamps, clips, brackets, mechanical fasteners or any combination thereof, for example and without limitation. As illustrated in FIG. 3, in some applications, the gap between the assembly base rails 103 may be wider toward the front end 169 and narrower toward the rear end 170 of the paddleboard 168. This expedient may prevent inadvertent separation of adjacent rail segments 104 from each other in each assembly base rail 103 during use of the paddleboard 168. In some embodiments, the assembly base 102 may be fabricated in one piece with the paddleboard 168 according to the knowledge of those skilled in the art. In FIG. 33, the paddleboard seat assembly 101 is shown detached from the paddleboard 168.

Figure 16:
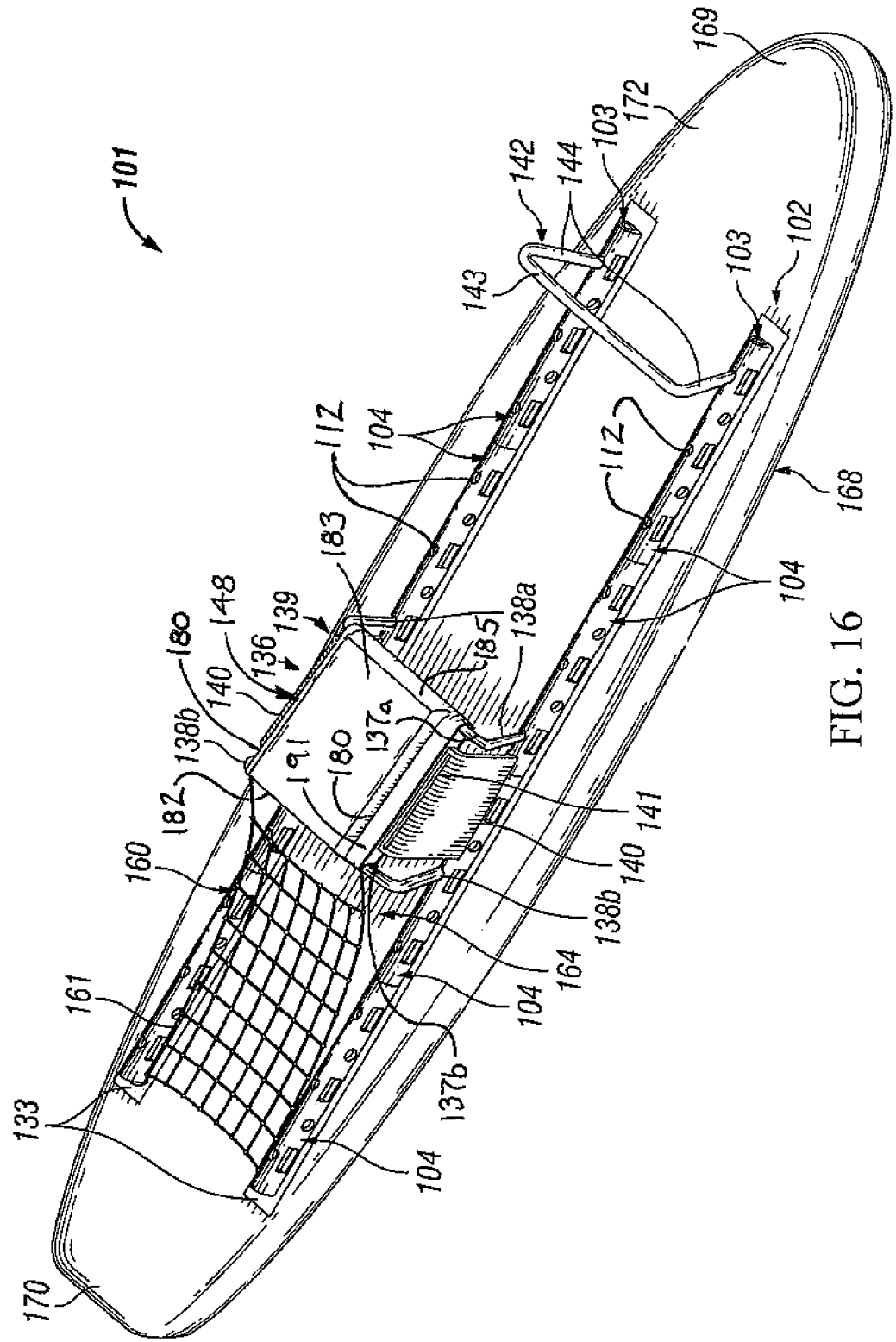
FIG. 16 is a perspective view of an alternative illustrative embodiment of the paddleboard seat assemblies, deployed in place on a paddleboard in typical application of the assembly.
Figure 19:
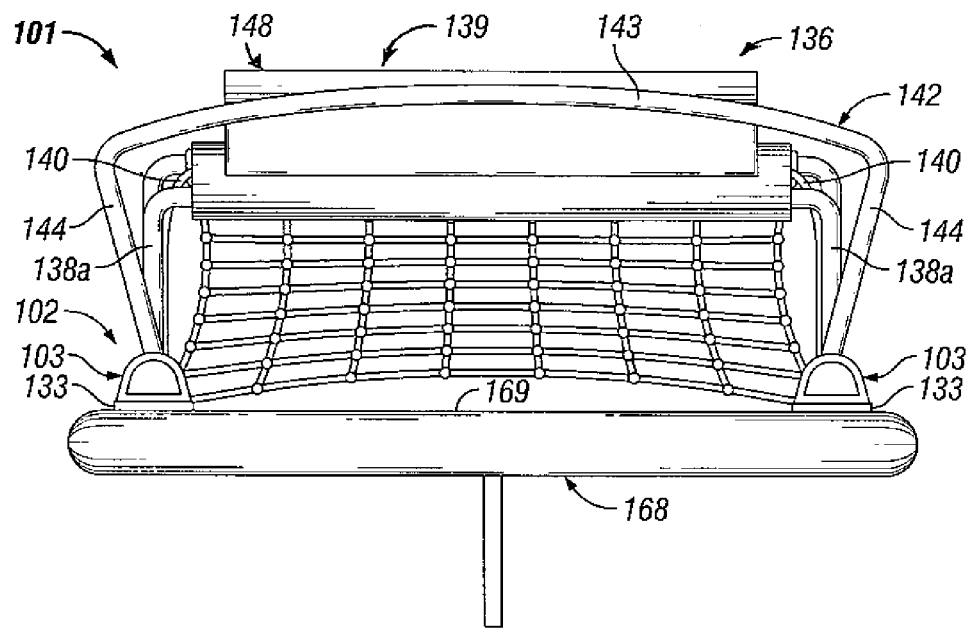
FIG. 19 is a front view of the alternative illustrative paddleboard seat assembly deployed on the paddleboard.
Figure 20:
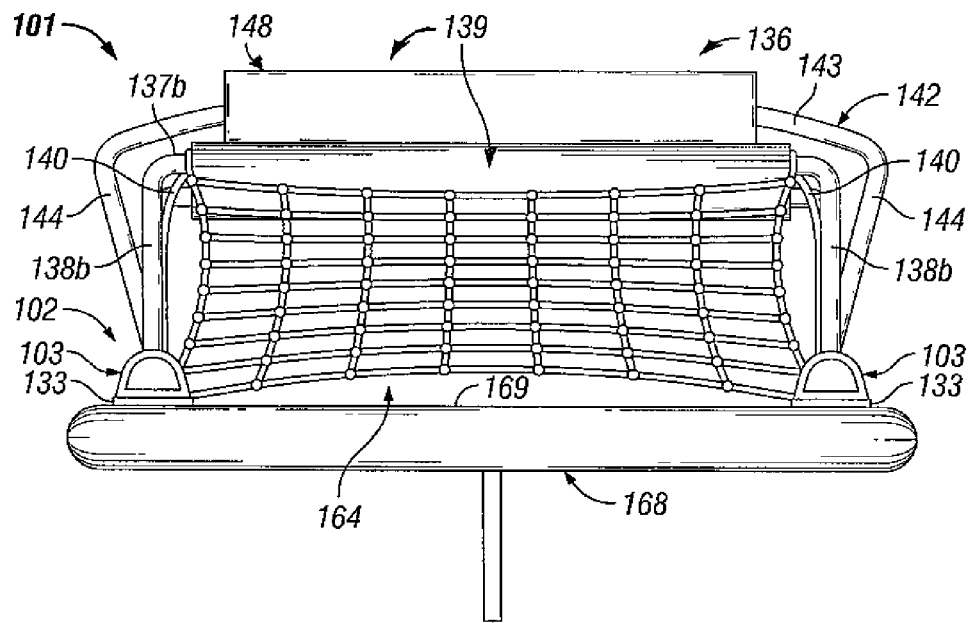
FIG. 20 is a rear view of the alternative illustrative paddleboard seat assembly deployed on the paddleboard.
Figure 25:
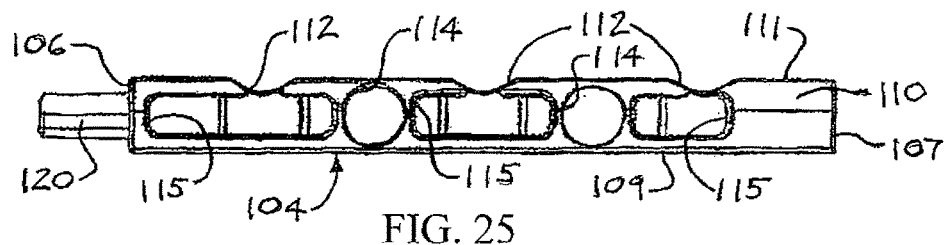
FIG. 25 is a left side view of the typical rail segment of the modular assembly base rail of the alternative illustrative paddleboard seat assembly.
Figure 26:
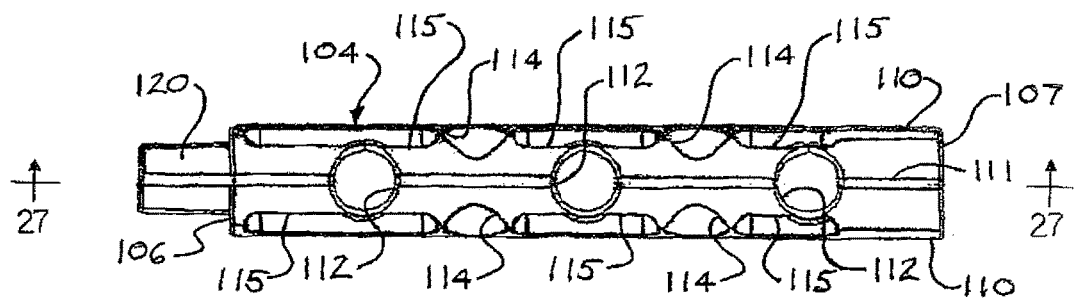
FIG. 26 is a top view of the typical rail segment of the modular assembly base rail of the alternative illustrative paddleboard seat assembly.
Figure 27:
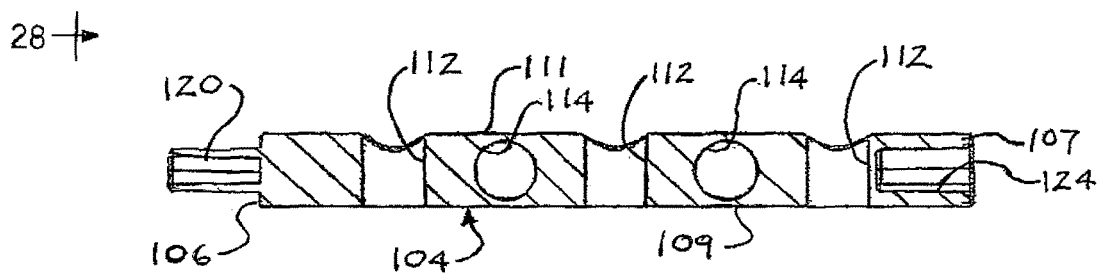
FIG. 27 is a longitudinal sectional view, taken along section lines 27-27 in FIG. 26, of the rail segment.
Figure 28:
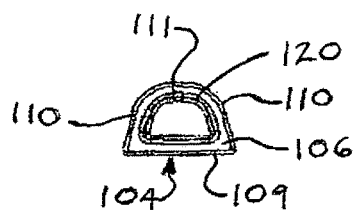
FIG. 28 is an end view of a typical male connector end of the rail segment, taken along viewing lines 28-28 in FIG. 27.

As illustrated in FIGS. 16-18, the seat 136 of the paddleboard seat assembly 101 may include a pair of generally elongated, parallel, spaced-apart front and rear seat frame members 137a and 137b, respectively. A pair of front seat insertion segments 138a may extend perpendicularly from opposite ends, respectively, of the front seat frame member 137a. A pair of rear seat insertion segments 138b may extend perpendicularly from opposite ends, respectively, of the rear seat frame member 137b. The seat insertion segments 138a, 138b of each seat frame member 137a, 137b may be inserted into the upper connector openings 112 of a pair of rail segments 104 in the respective assembly base rails 103 and may be secured therein via a friction fit, threaded, quick disconnect and/or other connection known by those skilled in the art to mount the seat frame members 137a, 137b on the assembly base rails 103 in upward-standing relationship to the assembly base 102.

Figure 35:
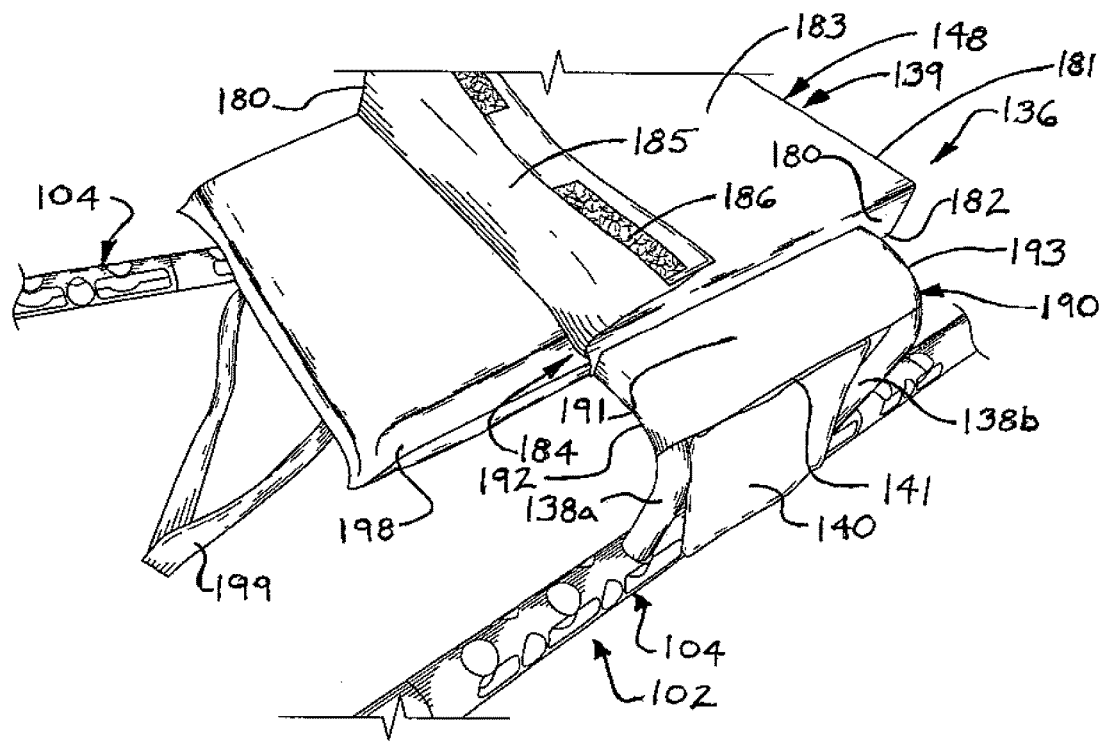
FIG. 35 is a perspective view of a typical seat of an illustrative embodiment of the paddleboard seat assembly, with a flotation device partially removed from a seat cushion enclosure of the seat.
Figure 36:
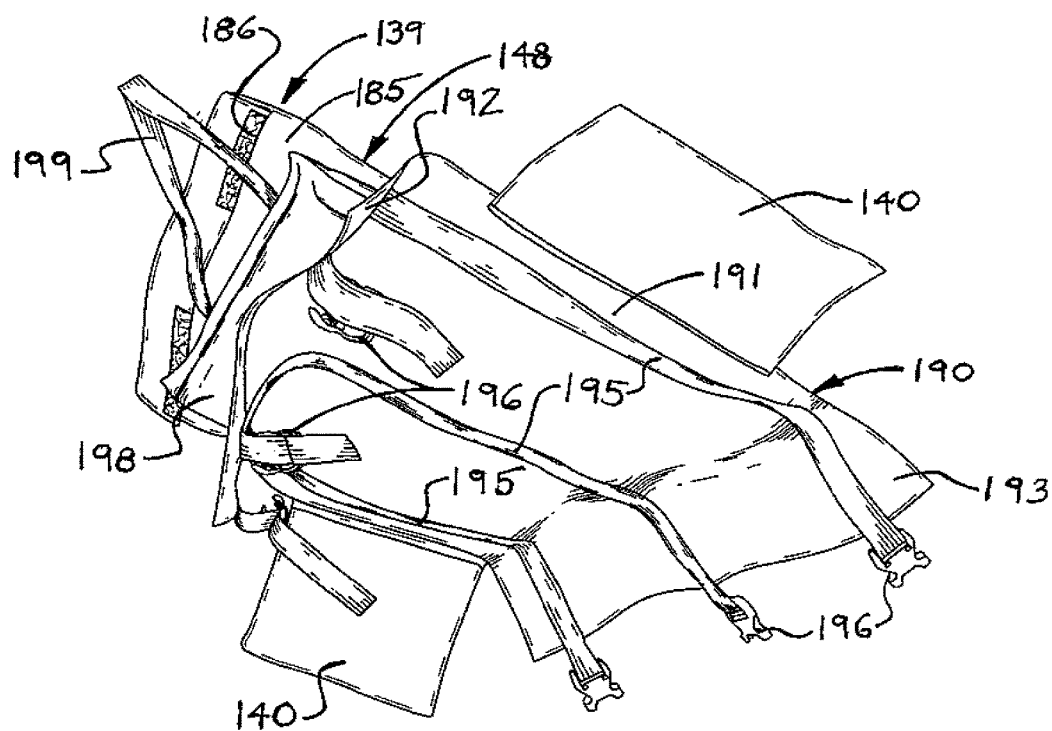
FIG. 36 is a bottom perspective view of the seat cushion enclosure detached from the seat and the flotation device partially removed from the seat cushion enclosure.

As illustrated in FIGS. 35 and 36, the seat 136 may further include a seat cushion 139 which is supported by the seat frame members 137a, 137b. In some embodiments, the seat cushion 139 may include a seat cushion enclosure 148 which is mounted on the seat frame members 137a, 137b and a cushion 198 which is contained in the seat cushion enclosure 148. A cushion strap 199 may extend from the cushion 198. In some embodiments, the cushion 198 may include a flotation device which may be standard or conventional. As illustrated in FIG. 35, the seat cushion enclosure 148 may be generally rectangular and may include a pair of generally parallel, spaced-apart side enclosure portions 180; a rear enclosure portion 181 which extends between the side enclosure portions 180; and a lower enclosure portion 182 and an upper enclosure portion 183 which extend between the side enclosure portions 180 and the rear enclosure portion 181. The seat cushion enclosure 148 has an enclosure interior 184 which is sized and shaped to contain the cushion 198. The seat cushion enclosure 148 may additionally have an enclosure flap 185 which normally closes the enclosure interior 184. In some embodiments, the enclosure flap 185 may extend forwardly from the upper enclosure portion 183, as illustrated. In the closed position, the enclosure flap 185 may be detachably secured to the lower enclosure portion 182 such as via at least one flap securing device 186 to enclose the cushion 198 in the enclosure interior 184. The enclosure flap 185 may be selectively detached from the lower enclosure portion 182 to open and expose the enclosure interior 184 and facilitate insertion and removal of the cushion 198 into and from, respectively, the enclosure interior 184.

The seat cushion enclosure 148 may be mounted to the seat frame members 137a, 137b according to any suitable structure or technique which is known by those skilled in the art. For example and without limitation, in some embodiments, the seat cushion enclosure 148 may be supported by an enclosure mount panel 190, which may be placed across the seat frame members 137a, 137b and secured. As illustrated in FIG. 36, the enclosure mount panel 190 may include a middle panel portion 191 and a front panel portion 192 and a rear panel portion 193 which extend from opposite ends of the middle panel portion 191. The seat cushion enclosure 148 may be stitched, sewn, fastened and/or otherwise attached to the middle panel portion 191 of the enclosure mount panel 190 according to the knowledge of those skilled in the art. Multiple enclosure mount straps 195, each fitted with strap connectors 196, may be sewn or otherwise attached to the underside of the middle panel portion 191, the front panel portion 192 and the rear panel portion 193 in the fore-aft direction of the enclosure mount panel 190.

The enclosure mount panel 190 may be fastened to the front seat frame member 137a and the rear seat frame member 137b by placing the middle panel portion 191 across the top of the front seat frame member 137a and the rear seat frame member 137b. The front panel portion 192 may next be extended around the front of and beneath the front seat frame member 137a, and the rear panel portion 193 may be extended around the rear of and beneath the rear seat frame member 137b. The strap connectors 196 may then be fastened to secure the enclosure mount straps 195 and mount the enclosure mount panel 190 on the front seat frame member 137a and the rear seat frame member 137b.

The seat cushion enclosure 148 and the enclosure mount panel 190 may each be fabricated of a fabric material, mesh or other suitable material. As illustrated in FIG. 18, in some embodiments, the front seat insertion segments 138a may be shorter than the rear seat insertion segments 138b. Consequently, the front seat frame member 137a may be lower than the rear seat frame member 137b of the seat 136 to impart a forward-sloping configuration to the seat cushion 139. In some embodiments, at least one seat pocket flap 140 having a closeable pocket opening 141 may hang down from at least one side edge of the middle panel portion 191 of the enclosure mount panel 190 between the corresponding front seat insertion segment 138a and rear seat insertion segment 138b of the seat 136.

At least one balance bar 142 may be provided on the assembly base 102. In some embodiments, each balance bar 142 of the paddle seat assembly 101 may include an elongated balance bar frame member 143 and a pair of balance bar insertion segments 144 which extend perpendicularly from opposite ends of the balance bar frame member 143. As illustrated in FIGS. 16-20, in some embodiments, the balance bar insertion segments 144 may be inserted into the upper connector openings 112 (FIGS. 23-27) of a pair of rail segments 104 in the respective assembly base rails 103 and may be secured therein via a friction fit, threaded, quick disconnect and/or other connection known by those skilled in the art to mount the balance bar frame member 143 on the assembly base rails 103 in upward-standing relationship to the assembly base 102. Accordingly, a longitudinal axis of the balance bar 142 may extend perpendicular to a longitudinal axis of the assembly base rails 103. It will be appreciated by those skilled in the art that the seat 136 and one or more of the balance bars 142 may each be independently placed at any desired position along the length of the assembly base rails 103 according to the length of the legs of the paddleboard user 176 (FIG. 29) and the comfort of the paddleboard user 176 by selecting the desired upper connector openings 112 in the assembly base rails 103.

Figure 30:
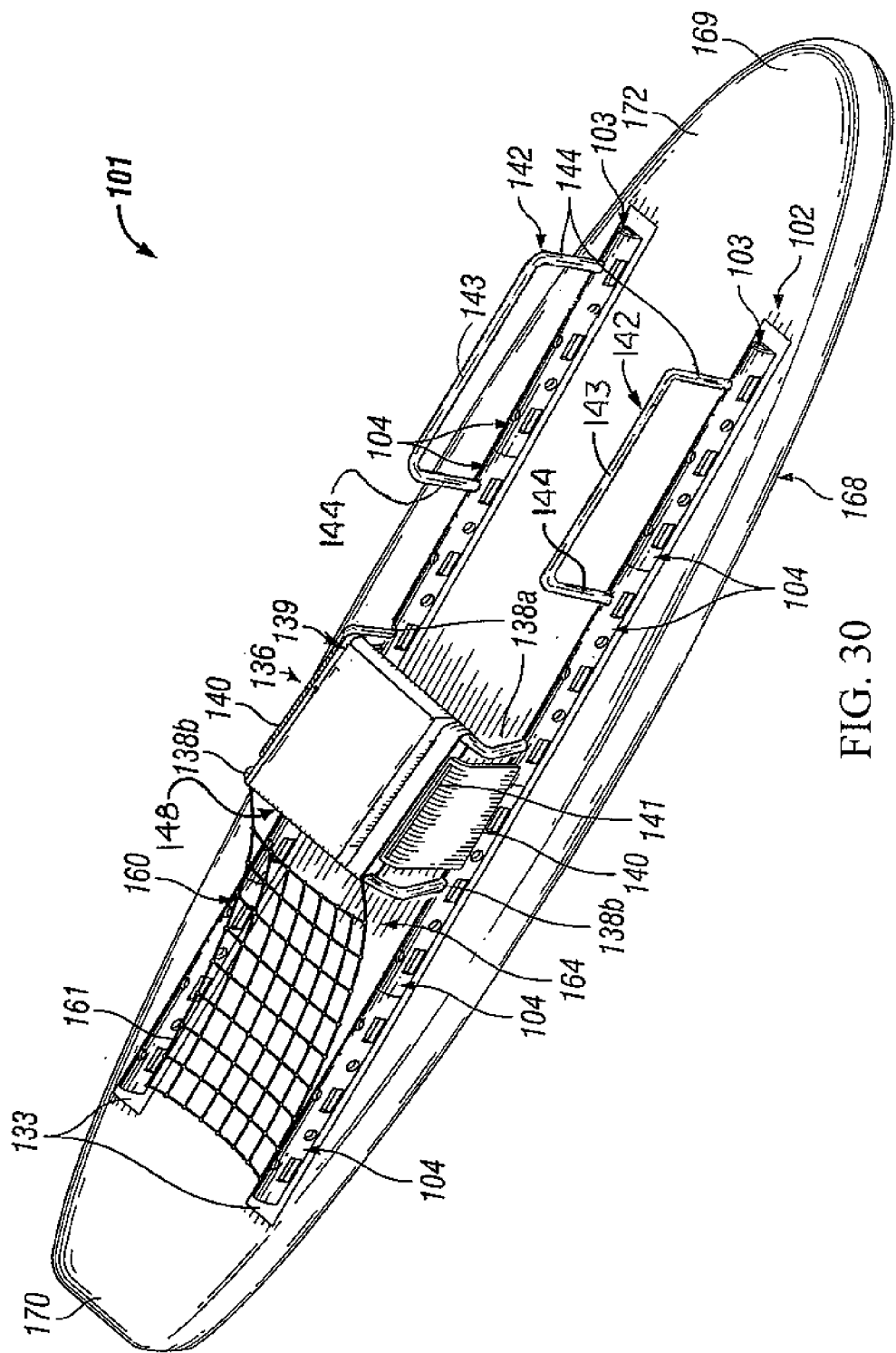
FIG. 30 is a perspective view of an alternative illustrative paddleboard seat assembly with a pair of balance bar frame members on the respective assembly base rails of the assembly base.

As illustrated in FIGS. 30-32, in some embodiments, at least one balance bar 142 may be provided on at least one assembly base rail 103 of the assembly base 102. The longitudinal axis of each balance bar 142 may extend parallel to the longitudinal axis of the corresponding assembly base rail 103 to which it is attached. The frame insertion segments 144 of each balance bar 142 may be inserted into a respective pair of upper connector openings 112 in one or more of the rail segments 104 in the corresponding assembly base rail 103.

As illustrated in FIGS. 16-20, an accessory holder 160 may be provided on the paddleboard seat assembly 101. In some embodiments, the accessory holder 160 may include an accessory net 161 which may be deployed between the seat 136 and the rear ends of the assembly base rails 103 of the assembly base 102. The accessory net 161 may be tied and/or otherwise attached to the rear seat frame member 137b or to the rear seat insertion segments 138b of the seat 136 and to the assembly base rails 103 using clamps, clips, mechanical fasteners and/or other suitable fastening techniques known by those skilled in the art. An accessory space 164 may be formed between the accessory net 161 and the upper paddleboard surface 172 of the paddleboard 168. An accessory (not illustrated) such as an ice chest may be placed in the accessory space 164 for access by the paddleboard user 176 during use of the paddleboard 168. The accessory net 161 secures the accessory on the paddleboard 168 particularly in the event of excessive movement of the paddleboard 168 on the water body.

Application of the paddleboard seat assembly 101 may be as was heretofore described with respect to the paddleboard assembly 1 in FIG. 15. Accordingly, the assembly base rails 103 may be assembled by connecting a selected number of the rail segments 104 to each other end-to-end, as illustrated in FIG. 21. The assembled assembly base rails 103 may be attached to the upper paddleboard surface 172 of the paddleboard 168 typically via the base attachment device 132, as illustrated in FIG. 22. The typically rectangular side connector openings 115 in each rail segment 104 of each assembly base rail 103 may enable a user to easily grip, manipulate and position the assembly base rails 103 for attachment to the paddleboard 168. In some embodiment, rail connecting members (not illustrated) may be inserted in registering circular side connector openings 114 (FIGS. 23 and 24) of rail segments 104 in the assembly base rails 103 of the assembly base 102 to impart additional structural stability to the assembly base 102 as deemed desirable.

The paddleboard 168 with the paddleboard seat assembly 101 deployed thereon may be placed on a body of water (not illustrated) such as a lake or ocean. A paddleboard user may sit on the seat 136. In applications in which the balance bar 142 spans the assembly base rails 103, as illustrated in FIG. 16, the paddleboard user may place his or her feet beneath the balance bar 142 as the paddleboard user propels the paddleboard 168 on the surface of the body of water by working the paddle 78, as was heretofore described with respect to FIG. 15. The paddleboard user can selectively and alternatively stand on the paddleboard 168 or sit on the seat 136 and work the paddle 78. Accordingly, the seat 136 enables the paddleboard user to rest between periods of standing on the paddleboard 168, particularly during prolonged periods of using the paddleboard 168. The balance bar or balance bars 142 may assist the user in transitioning from sitting to standing on the paddleboard 168, and vice-versa. In some applications, an ice chest (not illustrated) which contains beverages and/or food (not illustrated) may be placed in the accessory space 164 beneath the accessory net 161 for access by the paddleboard user 176. After use, the assembly base 102 may remain attached to the paddleboard 168, or may alternatively be detached from the paddleboard 168 for separate storage.

As illustrated in FIGS. 35 and 36, in some applications, the cushion 198 may be placed and secured in the enclosure interior 184 of the seat cushion enclosure 148 by closing and securing the enclosure flap 185. In other applications, the cushion 198 may be omitted from the enclosure interior 184 and the paddleboard user may sit on the empty seat cushion enclosure 148 as the enclosure mount panel 190 supports the weight of the paddleboard user between the front seat frame member 137a and the rear seat frame member 137b. In applications in which the cushion 198 is a flotation device, the paddleboard user can remove the flotation device 198 from the seat cushion enclosure 148 and toss the flotation device 198 to a person who struggles to remain afloat in the water body in emergency situations.

Figure 29:
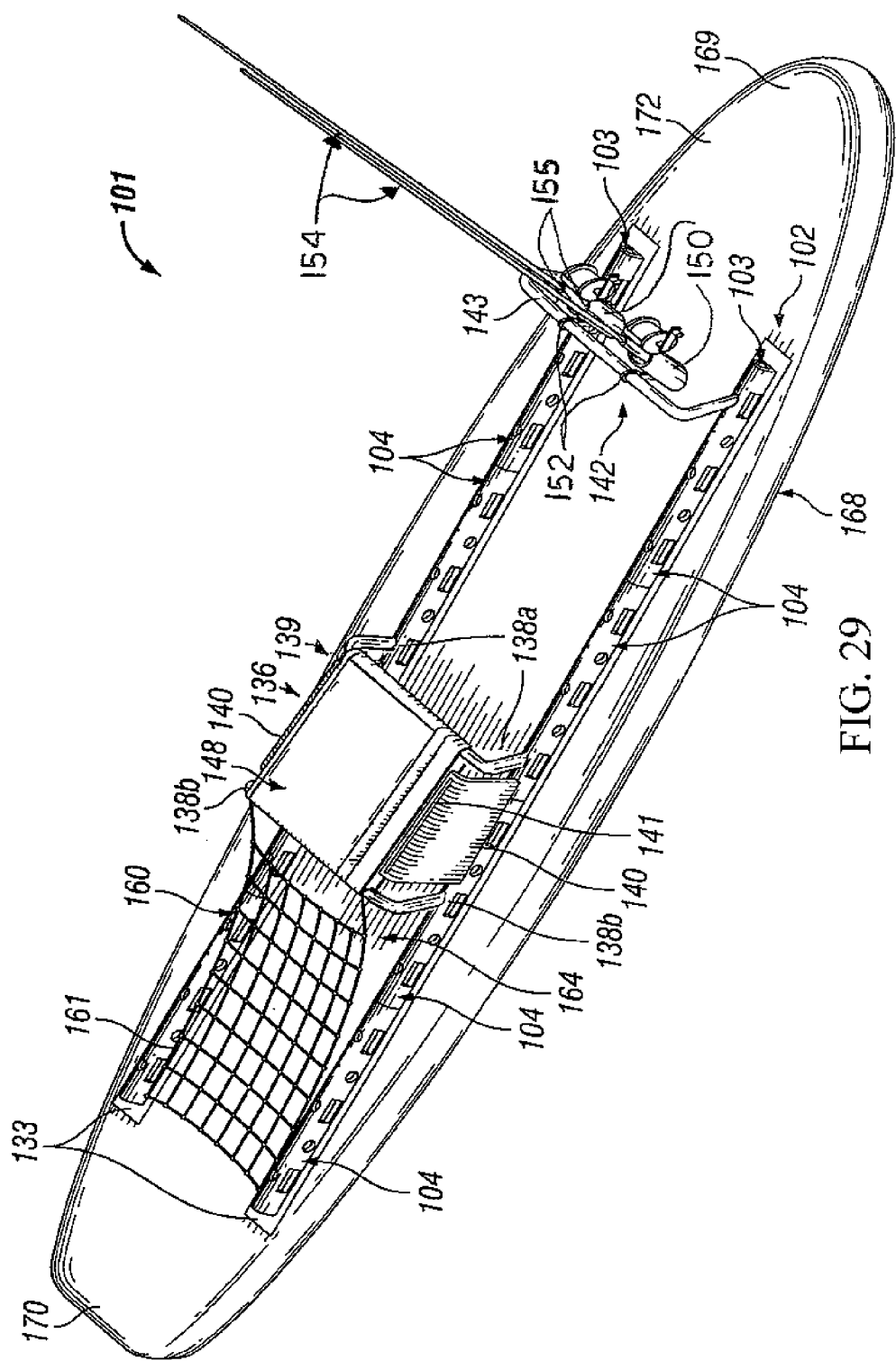
FIG. 29 is a perspective view of the alternative illustrative paddleboard seat assembly, with a pair of fishing rod holders attached to a balance bar frame member in typical application of the assembly.

As illustrated in FIG. 29, in some embodiments, at least one fishing rod holder 150 may be provided on at least one balance bar 142 of the paddleboard seat assembly 101. Each fishing rod holder 150 may be generally cup-shaped and may be secured on the balance bar frame member 143 of the balance bar 142 using a suitable fishing rod holder attachment mechanism 152. The fishing rod holder attachment mechanism 152 may include a clamp, clip, mechanical fastener and/or any other suitable attachment device which is suitable for the purpose. Alternatively, the fishing rod holder 150 may be fabricated in one piece with the balance bar 142 according to the knowledge of those skilled in the art. A fishing rod 154 may be deployed in the fishing rod holder 150 by inserting the fishing rod handle 155 in the fishing rod holder 150 with the fishing rod 154 extending upwardly. Accordingly, the paddleboard user can selectively retrieve the fishing rod 154 from the fishing rod holder 150 for use in fishing as the paddleboard user stands on the paddleboard 168 or sits on the seat 136. It will be recognized and understood that the fishing rod holders 150 may be attached to one or both of the balance bars 142 provided on one or both of the assembly base rails 103, respectively, of the assembly base 102 illustrated in FIGS. 30-32 in a similar manner.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A paddleboard seat assembly for a paddleboard, comprising:
    an assembly base including a pair of spaced-apart assembly base rails each having a plurality of modular rail segments connected in end-to-end relationship to each other;
    a seat carried by the assembly base rails of the assembly base;
    at least one balance bar carried by at least one assembly base rail of the assembly base; and
    at least one fishing rod holder carried by the at least one balance bar.

2. A paddleboard seat assembly for a paddleboard, comprising:
    an assembly base including a pair of spaced-apart assembly base rails each having a plurality of modular rail segments connected in end-to-end relationship to each other;
    a seat carried by the assembly base rails of the assembly base; and
    at least one accessory holder carried by the assembly base rails of the assembly base.

3. The paddleboard seat assembly of claim 2 wherein the at least one accessory holder comprises an accessory net carried by the assembly base and the seat.

4. A paddleboard seat assembly for a paddleboard, comprising:
    an assembly base including a pair of spaced-apart assembly base rails each having a plurality of modular rail segments connected in end-to-end relationship to each other;
    a seat carried by the assembly base rails of the assembly base; and
    wherein each of the plurality of modular rail segments comprises a rail segment body having a male connector end and a female connector end, a male connector carried by the male connector end, a connector cavity in the female connector end and at least one connector opening in the rail segment body, and wherein the seat is inserted in the at least one connector opening of each of a pair of the plurality of modular rail segments in the pair of spaced-apart assembly base rails, respectively.

5. A paddleboard seat assembly for a paddleboard, comprising:
    an assembly base including a pair of spaced-apart assembly base rails each having a plurality of modular rail segments connected in end-to-end relationship to each other;
    a seat carried by the assembly base rails of the assembly base; and
    a base attachment device configured to attach the assembly base to the paddleboard.

6. The paddleboard seat assembly of claim 1 wherein the seat comprises:
    a first pair of seat insertion segments carried by the pair of spaced-apart assembly base rails, respectively;
    a first seat frame member extending between the first pair of seat insertion segments;
    a second pair of seat insertion segments carried by the pair of spaced-apart assembly base rails, respectively;
    a second seat frame member extending between the second pair of seat insertion segments;
    an enclosure mount panel carried by and extending between the first frame member and the second frame member;
    a seat cushion carried by the enclosure mount panel, the seat cushion including:
        a seat cushion enclosure;

a removable cushion in the seat cushion enclosure; and at least one seat pocket flap having a closeable pocket opening carried by the enclosure mount panel and extending between at least one corresponding pair of the first pair of seat insertion segments and the second pair of seat insertion segments.

7. A paddleboard seat assembly for a paddleboard, comprising:
an assembly base including a pair of spaced-apart assembly base rails each having a plurality of modular rail segments connected in end-to-end relationship to each other, each of the plurality of modular rail segments including:
a rail segment body having a male connector end and a female connector end;
a male connector extending from the male connector end;
a connector cavity in the female connector end;
a generally flat or planar rail segment base extending between the male connector end and the female connector end;
a pair of rail segment base side walls extending from opposite side edges of the rail segment base;
a convex rail segment base upper wall extending between the rail segment base side walls; and
at least one upper connector opening in the rail segment base upper wall; and
a seat carried by the assembly base rails of the assembly base, the seat inserted in the at least one upper connector opening of each of a pair of the plurality of modular rail segments in the pair of spaced-apart assembly base rails, respectively.

8. The paddleboard seat assembly of claim 7 further comprising at least one balance bar carried by at least one assembly base rail of the assembly base.

9. The paddleboard seat assembly of claim 8 further comprising at least one fishing rod holder carried by the at least one balance bar.

10. The paddleboard seat assembly of claim 7 further comprising at least one accessory holder carried by the assembly base rails of the assembly base.

11. The paddleboard seat assembly of claim 10 wherein the at least one accessory holder comprises an accessory net carried by the assembly base and the seat.

12. The paddleboard seat assembly of claim 7 further comprising a base attachment device configured to attach the assembly base to the paddleboard.

13. The paddleboard seat assembly of claim 7 wherein the seat comprises:
a first pair of seat insertion segments carried by the pair of spaced-apart assembly base rails, respectively;
a first seat frame member extending between the first pair of seat insertion segments;
a second pair of seat insertion segments carried by the pair of spaced-apart assembly base rails, respectively;
a second seat frame member extending between the second pair of seat insertion segments;
an enclosure mount panel carried by and extending between the first frame member and the second frame member;
a seat cushion carried by the enclosure mount panel, the seat cushion including:
a seat cushion enclosure;
a removable cushion in the seat cushion enclosure; and at least one seat pocket flap having a closeable pocket opening carried by the enclosure mount panel and extending between at least one corresponding pair of the first pair of seat insertion segments and the second pair of seat insertion segments.

14. A paddleboard seat assembly for a paddleboard, comprising:
an assembly base including a pair of spaced-apart assembly base rails each having a plurality of modular rail segments connected in end-to-end relationship to each other, each of the plurality of modular rail segments including:
a rail segment body having a male connector end and a female connector end;
a male connector extending from the male connector end;
a connector cavity in the female connector end;
a generally flat or planar rail segment base extending between the male connector end and the female connector end;
a pair of rail segment base side walls extending from opposite side edges of the rail segment base;
a convex rail segment base upper wall extending between the rail segment base side walls; and
at least one upper connector opening in the rail segment base upper wall;
a seat carried by the assembly base rails of the assembly base, the seat including:
a first pair of seat insertion segments inserted in the at least one connector opening of each of a first pair of the plurality of modular rail segments in the pair of spaced-apart assembly base rails, respectively;
a first seat frame member extending between the first pair of seat insertion segments;
a second pair of seat insertion segments inserted in the at least one connector opening of each of a second pair of the plurality of modular rail segments in the pair of spaced-apart assembly base rails, respectively;
a second seat frame member extending between the second pair of seat insertion segments;
an enclosure mount panel carried by and extending between the first frame member and the second frame member,
a seat cushion carried by the enclosure mount panel, the seat cushion including:
a seat cushion enclosure;
a removable cushion in the seat cushion enclosure; and
at least one seat pocket flap having a closeable pocket opening carried by the enclosure mount panel and extending between at least one corresponding pair of the first pair of seat insertion segments and the second pair of seat insertion segments;
at least one balance bar carried by at least one of the assembly base rails of the assembly base, the at least one balance bar including:
a pair of balance bar insertion segments inserted in the at least one connector opening of each of a third pair of the plurality of modular rail segments in the pair of spaced-apart assembly base rails, respectively; and
a balance bar frame member extending between the pair of balance bar insertion segments.

15. The paddleboard seat assembly of claim 14 further comprising at least one accessory holder carried by the assembly base rails of the assembly base.

16. The paddleboard seat assembly of claim 15 wherein the at least one accessory holder comprises an accessory net carried by the assembly base and the seat.

17. The paddleboard seat assembly of claim 14 further comprising a base attachment device configured to attach the assembly base to the paddleboard.

18. The paddleboard seat assembly of claim 17 wherein the base attachment device comprises at least one pair of complementary hook and loop fastener strips.

* * * * *